United States Patent [19]

Kitahara

[11] Patent Number: 4,795,334

[45] Date of Patent: Jan. 3, 1989

[54] CONCRETE BLOCK MOLDING MACHINE

[75] Inventor: Tetsugoro Kitahara, Okayama, Japan

[73] Assignee: Kabushiki Kaisha Tiger Machine Seisakusho, Takahashi, Japan

[21] Appl. No.: 114,676

[22] Filed: Oct. 29, 1987

[51] Int. Cl.$^4$ ............................................. B28B 15/00
[52] U.S. Cl. ...................................... 425/88; 425/182; 425/186; 425/195; 425/451
[58] Field of Search ................. 425/88, 182, 185, 186, 425/190, 193, 195, 413, 451, 452, 453, DIG. 200, DIG. 201, DIG. 202

[56] References Cited

U.S. PATENT DOCUMENTS

| 3,141,193 | 7/1964 | Slemmons | 425/DIG. 201 |
| 4,472,127 | 9/1984 | Cyriax et al. | 425/190 |
| 4,555,228 | 11/1985 | Nishiike et al. | 425/186 |

Primary Examiner—Jay H. Woo
Assistant Examiner—C. Scott Bushey
Attorney, Agent, or Firm—Flynn, Thiel, Boutell & Tanis

[57] ABSTRACT

A concrete block molding machine including: a gate-type frame constituting the body of the apparatus; a rail frame extending to right and left from the gate-type frame and; a pair of presses slidably mounted on the rail frame and adapted to move along the rail frame by the action of hydraulic cylinders in such a manner that when one of the presses is on a molding machine held by the gate-type frame, the other press is stationed at a position where a pressing member and a molding box of a changeable mold assembly are changed; and resilient clampers by which the molding box placed on the molding machine is attached to a vertically movable table device. In such an arranged construction, the mold changing operation can be carried out in a reduced time and complicated and laborious work is eliminated.

2 Claims, 4 Drawing Sheets

CONCRETE BLOCK MOLDING MACHINE

BACKGROUND OF THE INVENTION

1. Field of the Invention

The present invention relates to a concrete block molding machine which enables a mold to be changed in a short time.

2. Description of the Prior Art

In recent years, there is a trend for diversification of concrete blocks. In concrete molding machines of a type in which a concrete block is separated from a mold immediately after molding, laborious work is required for changing the mold each time the kind of product is changed. In particular, a frequent change of the mold is necessary with small-lot and large-variety production.

In the conventional process, a considerably long time, say several tens of minutes to several hours, is required for changing a mold. In consequence, only a short time can be used for the molding operation. In particular, a fixing device for fixing a mold to a molding machine is made complicated in construction due to the necessity of changing of the mold and accidents are often experienced in mounting the mold in the machine because the mounting requires manual labor of several workers who are obliged to work in a restricted area in front of the molding machine. More specifically, the mounting requires a series of operations including suspending the mold, for example, by a chain block, placing the mold on a conveyor in front of the molding machine, correctly locating the mold in relation to the molding machine, fixing the mold, fixing a pressing member onto a press girder, and adjusting the machine.

SUMMARY OF THE INVENTION

Accordingly, an object of the present invention is to eliminate the necessity for the laborious work which has been essentially required in the conventional mold changing operation.

To this end, according to the present invention, there is provided a concrete block molding machine comprising: a gate-type frame constituting the body of the apparatus; a rail frame extending rightwardly and leftwardly from the gate-type frame and; a pair of presses slidably mounted on the rail frame and adapted to move along the rail frame by the action of hydraulic cylinders in such a manner that when one of the presses is on the molding machine and is held by the gate-type frame, the other press is stationed at a position where the pressing member and the molding box of a changeable mold assembly are changed; and resilient clampers by which the molding box placed on the molding machine is attached to a vertically movable table device.

In the concrete block molding machine of the present invention, the molding position is always occupied by one of the presses, while the other press is located either on the left or right mold changing rest where the change of the mold assembly is conducted without difficulty.

The mounting of the pressing member on the press can be conducted easily by setting the pressing member such that a plurality of projections on the pressing member are inserted into a plurality of through holes in the press and then inserting pins into horizontal holes formed in the projections, thereby fixing the pressing member.

On the other hand, the molding box is suspended from the press by fitting an L-shaped suspension member on the flange thereof in a notch formed in a pressing mold mounting plate provided on the press.

DETAILED DESCRIPTION OF THE PREFERRED EMBODIMENTS

An embodiment of the concrete block molding apparatus of the present invention, having a pair of presses, will be described hereinunder with reference to the accompanying drawings.

Figure 1:
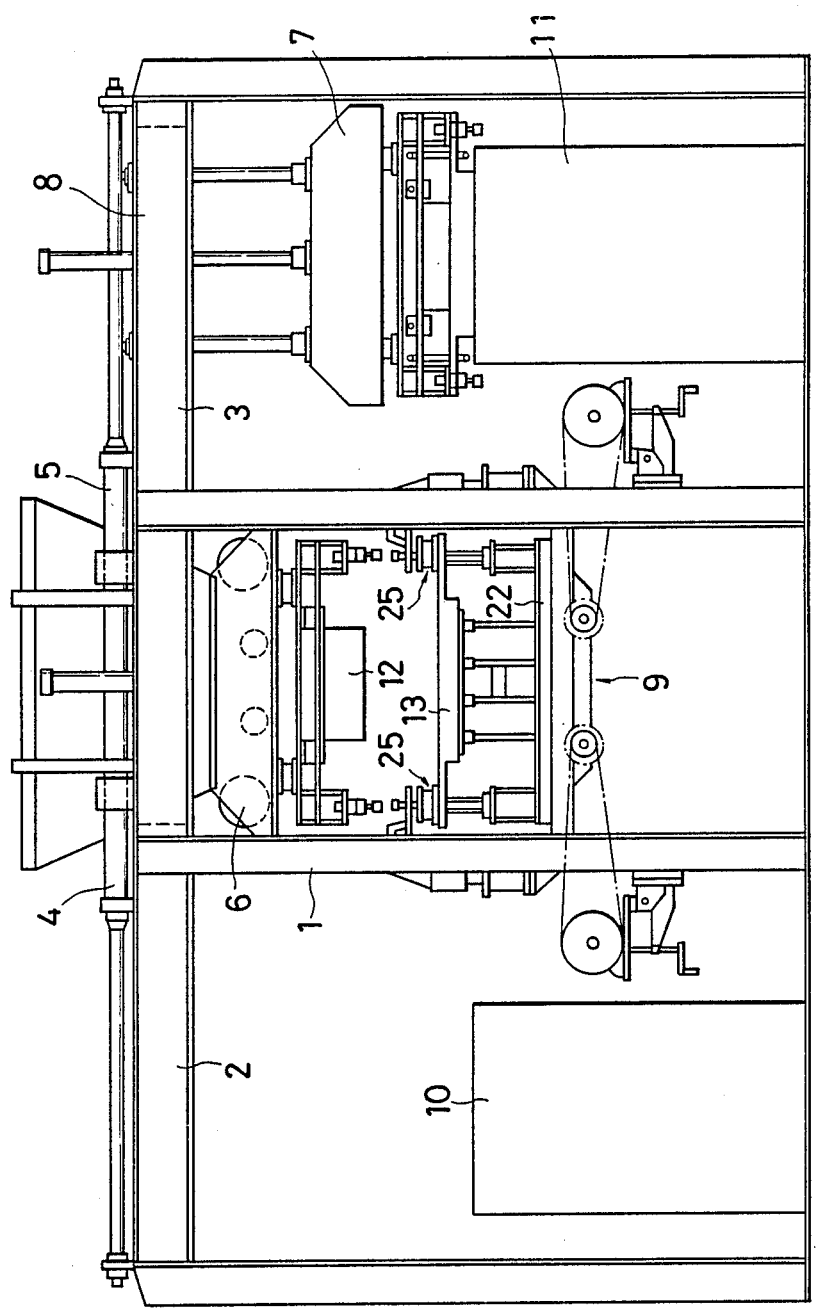
FIG. 1 is a front elevational view of an embodiment of the present invention.
Figure 2:
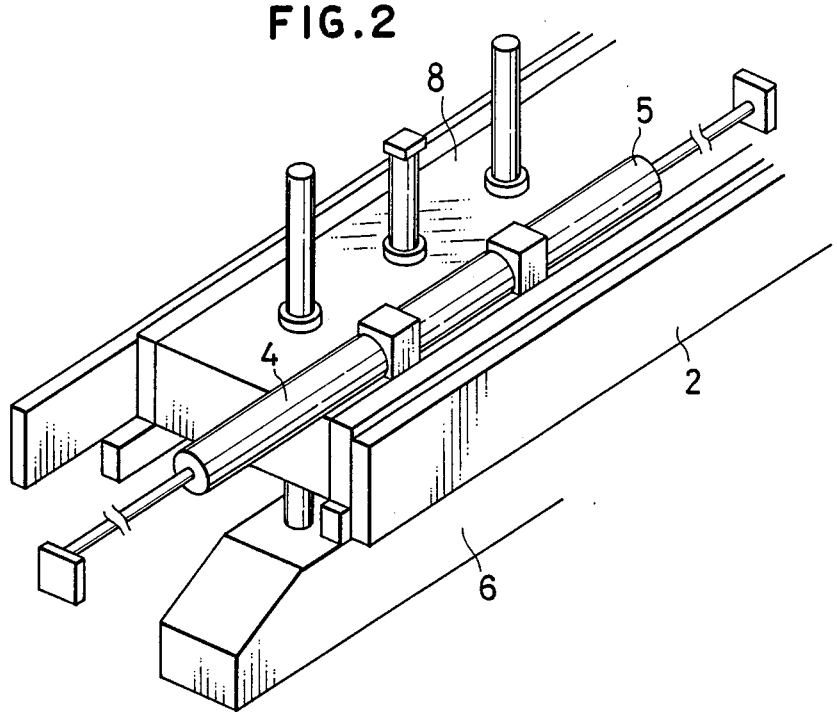
FIG. 2 is an enlarged perspective view of an upper portion of a gate-type frame.

FIG. 1 is a front elevational view of the entire concrete block molding apparatus, while FIG. 2 is an enlarged perspective view of an upper portion of the gate-type frame of the molding apparatus. Rail frames 2, 3 extend to the left and to the right, respectively, from the gate-type frame 1. A carriage 8 carrying a pair of presses 6 and 7 is adapted to run along the rail frames 2, 3 by the action of a pair of hydraulic cylinders 4, 5. A molding machine 9 is situated at the center of the gate-type frame 1. Left and right mold changing rests 10, 11 are disposed on the respective sides of the gate-type frame 1.

Figure 3:
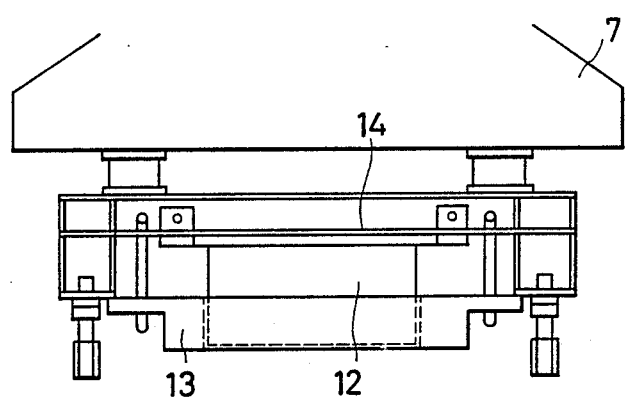
FIG. 3 is front elevational view of a mold assembly in assembled state.
Figure 4:
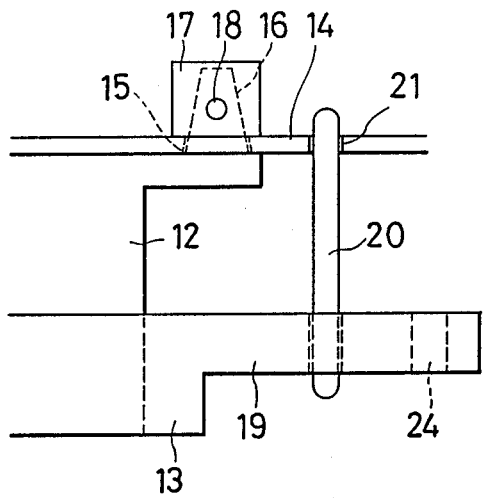
FIG. 4 is an enlarged view of a portion of the mold assembly.

In FIG. 1, the apparatus is shown in a state in which a mold assembly operation for changing the mold is being conducted on the right mold changing rest 11. This can be conducted by attaching the pressing member 12 to the press 7 and then securing the molding box 13 as illustrated in FIG. 3.

The mounting of the pressing member 12 on the press 7 is conducted by inserting each tapered pin 16, which is fixed onto the periphery of the upper end of the pressing member 12, into receiving hole 15 formed in the pressing member mounting plate 14 of the press 7, placing a cover 17 on the projecting tapered pin 16 and inserting a fixing pin 18 into holes formed in the tapered pin 16 through holes formed in the cover 17.

The molding box 13 has a flange 19 on which is pivotally secured an L-shaped suspension member 20. An angle portion of the upperpart of the L-shaped suspension member 20 is inserted into a notch 21 and is rotated so that the molding box 13 is suspended from the press 7.

The mold assembly thus prepared is moved to the center of the apparatus where the molding machine 9 is situated, when replacing the used mold assembly with it. The molding box 13 is correctly located with respect to the molding machine 9 by inserting locating projections 23 on a vertically movable table device 22 into through holes 24 formed in the flange 19 of the mold 13. Then, the located molding box 13 is clamped by resilient clampers 25. Subsequently, the L-shaped suspension member 20 and the fixing pins 18 are disengaged, so that the pressing member 12 and the molding box 13 are separated from the press 7.

Figure 5:
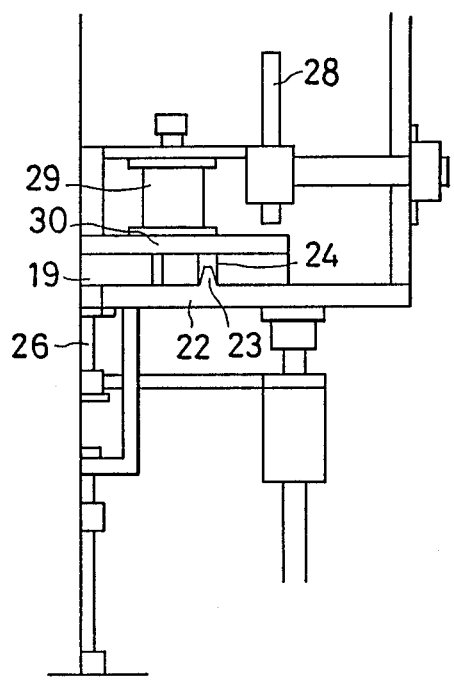
FIG. 5 is a front elevational view of the right half portion of a structure for pressing the mold.
Figure 6:
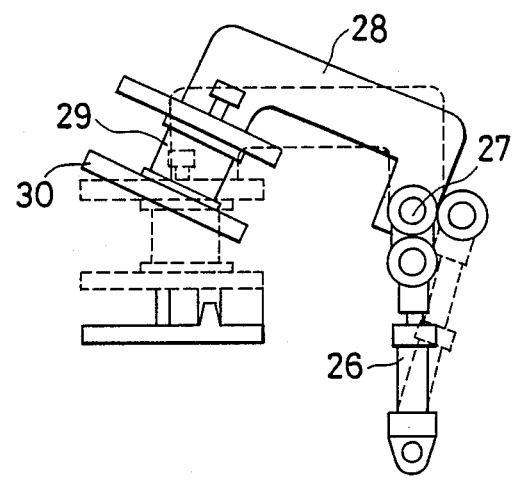
FIG. 6 is a side elevational view of a resilient clamper for illustrating the operation of the clamper.

The clamper 25 has a construction as shown in FIGS. 5 and 6. Namely, the clamper 25 has a pressing plate 30 which is secured through a resilient member 29 to the end of a pressing member 28 which in turn is fixed to a rotary shaft 27 adapted to be rotated by the action of the hydraulic cylinder 26.

The arrangement is such that, as the hydraulic cylinder 26 operates, the pressing member 28 is swung so as to enable the pressing plate 30 to resiliently press a peripheral portion of the molding box 13, thereby fixing the molding box 13 to the table device 22.

The apparatus is now ready for molding a concrete block. For the purpose of changing the mold, the mold assembly now used in the molding machine 9 is moved onto the left mold changing rest 10 by leftward stroking of the carriage 8. Simultaneously, a new mold assembly is brought into the molding machine 9 from the right mold changing rest 11 and this new mold assembly are separated to enable the molding of a new type of product. Meanwhile, the old mold assembly moved onto the left mold changing rest is changed with a mold assembly which is to be used next.

Thus, one of the two mold assemblies is renewed or changed while the other is operating, so that different types of products can be produced by the successive change of the mold assembly.

The concrete block molding apparatus of the present invention makes it possible to produce a variety of types of concrete blocks by using different molds on a single molding machine. In addition, the molds can be changed easily so that the efficiency of the molding operation can be improved.

What is claimed is:

1. A concrete block molding machine comprising:
   a centrally located gate-type frame and a concrete block molding apparatus located in said gate-type frame, said concrete block molding apparatus including a vertically movable lower table;
   a pair of elongated rail frames extending horizontally from said gate-type frame close to the upper end thereof, said rail frames extending over mold-changing zones, respectively;
   a carriage movably mounted on said rail frames for reciprocable movement therealong;
   a pair of presses suspended from said carriage for reciprocable movement therewith between a first position in which a first of said presses is located in said gate-type frame and a second of said presses is in one of said mold-changing zones, and a second position in which said second press is in said gate-type frame and said first press is in one of said mold changing zones, each of said presses including an upper, horizontal, pressing-mold, mounting plate;
   a pair of mold assemblies, each mold assembly being associated with one of said presses, each mold assembly comprising an upper pressing member and a lower molding box, said upper pressing member and said mounting plate having first releasable securing means for securing said upper pressing member to said mounting plate; said mounting plate and said lower molding box having second releasable securing means for securing said lower molding box to said mounting plate;
   said vertically movable lower table and said lower molding box having locating means for locating said molding box on said vertically movable lower table; and clamping means for releasably clamping said lower molding box to said vertically movable lower table.

2. A concrete block molding machine comprising:
   a centrally located gate-type frame and a concrete block molding apparatus located in said gate-type frame, said concrete block molding apparatus including a vertically movable lower table;
   a pair of laterally aligned, elongated rail frames extending horizontally in laterally opposite directions from said gate-type frame close to the upper end thereof, said rail frames extending over first and second mold-changing zones disposed on opposite lateral sides of said gate-type frame;
   a carriage movably mounted on said rail frames for linear reciprocable movement lengthwise therealong;
   a pair of presses suspended from said carriage for reciprocable movement therewith between a first position in which a first of said presses is located in said gate-type frame and a second of said presses is in said first mold-changing zone and a second position in which said first press is in said second mold-changing zone and said second press is in said gate-type frame; each of said presses including an upper, horizontal, vertically movable, pressing-mold, mounting plate having receiving hole means therethrough and notch means;
   a pair of mold assemblies, each mold assembly being associated with one of said presses, each mold assembly comprising an upper pressing member and a lower molding box, said upper pressing member having tapered block means extending upwardly therefrom and inserted through said receiving hole means, pin means extendable into said block means for releasably fixing said upper pressing member to said pressing-mold, mounting plate, and an L-shaped suspension member pivotally mounted on said lower molding box and inserted into said notch so that said lower molding box is removably suspended from said pressing-mold, mounting plate;
   said vertically movable table device having locating projection means extending upwardly therefrom, said lower molding box having hole means formed therein for receiving said locating projection means for locating said lower molding box on said vertically movable table;
   and clamping means for releasably clamping said lower molding box to said vertically movable table device, said clamping means comprising a pivotally mounted pressing member mounted on said molding apparatus, a hydraulic motor for pivoting said pressing member, a resilient member mounted on said pressing member, and a pressing plate mounted on said resilient member and adapted to press said lower molding box against said vertically movable table device.

* * * * *